March 16, 1943.   F. M. ARCHIBALD   2,313,910
PURIFICATION OF RECOVERED SULPHURIC ACID
Filed March 16, 1940
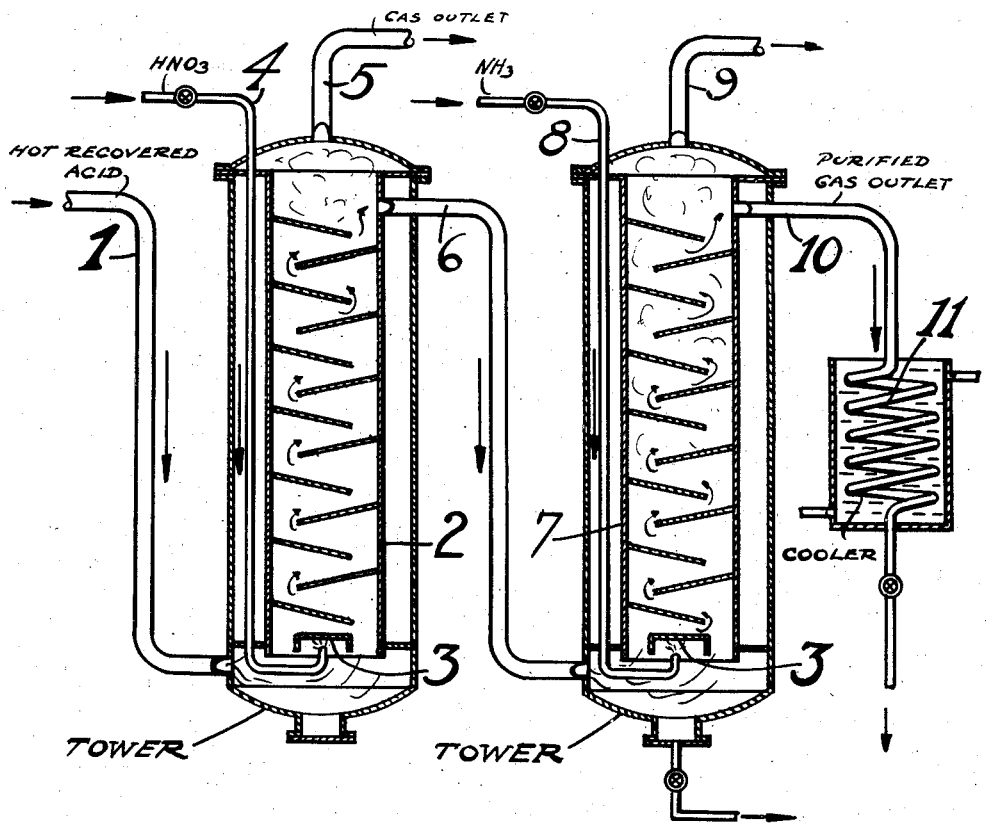

Patented Mar. 16, 1943

2,313,910

UNITED STATES PATENT OFFICE 2,313,910

PURIFICATION OF RECOVERED SULPHURIC ACID

Francis M. Archibald, Elizabeth, N. J., assignor to Standard Oil Development Company, a corporation of Delaware Application March 16, 1940, Serial No. 324,243

1 Claim. (Cl. 23—173)

This invention relates to the removal of carbonaceous materials from recovered sulphuric acid, particularly acid recovered from the treating of petroleum distillates with concentrated sulphuric acid or from the preparation of alcohols by sulphation of unsaturated hydrocarbons.

Recovered sulphuric acid is first concentrated to give an acid of 88 to 90% concentration. The concentrated acid, however, contains 0.1 to 3.0% carbon, in any one or any combination of three forms: (1) free carbon in solid particles varying in size down to colloidal; (2) carbon compounds which precipitate or flocculate from the sulphuric acid on dilution with water; and (3) carbon compounds which are soluble in both sulphuric acid and water. The presence of solid particles suspended in the sulphuric acid or the presence of flocculatable carbon is detrimental for its further use, especially in certain processes such as in the manufacture of alcohols. When sulphuric acid is used to treat hydrocarbons, it is necessary to separate the acid from the hydrocarbons after the two have been intimately mixed; the presence of the solid particles tends to cause emulsification and interferes with this separation by inhibiting layer separation. The acid layer after separation from the hydrocarbons is diluted with water and otherwise treated to separate useful products. Any carbonaceous material present or any carbon compounds which precipitate from the acid on solution also very seriously interfere with the separation of these products.

It is well known that this carbonaceous material may be removed by oxidizing with nitric acid or nitric oxide obtained by the oxidation of ammonia or from an electric arc. A small part of the nitric acid does not react to oxidize the carbon but combines with the sulphuric acid to form nitrosyl sulphate. This in turn is eliminated by adding ammonia, ammonium sulphate, urea or hydrogen sulphide. If these reactions are carried out at temperatures near the boiling point of the acid (200°–230° C.) the product is clean and suitable for many uses to which the black acid cannot be put. The cost of this process is prohibitive, however, because of the large amount of nitric acid required.

The object of this invention, therefore, is to remove or render soluble in water both the free carbon and the compounds which are precipitated by water, i. e. to convert the solid or water-insoluble carbonaceous materials to compounds that are soluble in the sulphuric acid and water in such a manner that a minimum of acid is used and the process can be carried out without prohibitive cost.

Specifically this invention consists of a method whereby the hot concentrated acid coming from the recovery unit may be treated continuously with a carefully controlled amount of nitric acid and ammonia successively. Such a process has commercial feasibility on acids of lower carbon content (i. e. less than 1.5%), but this is possible only when the chemical treatment is carried out in such a manner that the chemicals added are not volatilized and lost before they react completely. By this process the carbon content of the acid is reduced by about 50% and the product of the treatment can be diluted with water to any required strength without producing a precipitate or carbon flocculation. This makes it possible to use concentrated acid in the alcohol process repeatedly whereas only fresh acid could otherwise be used. In this process the hot concentrated black acid is mixed with the required amount of nitric acid, and run continuously into the bottom of a baffle tower. The acid mixture enters at a temperature of about 175° to 225° C., preferably above 188° C. The gases formed are drawn off the top and the acid overflows through an opening near the top into the bottom of a second tower where it meets a stream of anhydrous ammonia.

Referring more particularly to the accompanying drawing, hot recovered acid (black acid) is introduced through conduit 1 into tower 2. Nitric acid is introduced into tower 2 through conduit 4 so that mixing occurs under baffle 3 and thus ensures that the reaction will be protected from the loss of heat by a surrounding body of the acid already acted upon. Gases produced during the reaction are removed through opening 5 at the top. The acid overflows near the top of the tower through conduit 6 into tower 7 where it is mixed with ammonia introduced through conduit 8 to remove the nitrosyl sulphate formed by the action of nitric acid on the sulphuric acid. This action likewise takes place under a baffle for the same reasons described above. Fumes are allowed to escape through opening 9 in the top of the tower. The use of an excess of ammonia is avoided by sampling the product periodically and preparing a Kjeldahl determination for combined ammonia. The purified acid is removed through conduit 10 to cooler 11.

In practice the reconcentrated acid as it comes from the concentrator is heated to a temperature just below its boiling point and is passed into the baffle at the bottom and the nitric acid added to complete the reaction described above. The mixture passes concurrently up the tower and emerges from the top with all the carbon completely dissolved or oxidized. The quantity of nitric acid used is adjusted to the minimum by sampling the exit acid from the ammonia tower and diluting it with water about 5:1. A slight haze indicates a colloidal precipitate which eventually flocculates and gives a fluffy precipitate. The proper amount of nitric acid is then increased slightly so that on dilution there is no precipitate. The reduction in the total carbon content of the acid thus treated is sometimes so slight that it is difficult to measure it accurately. For example, acid having a carbon content of 0.19 to 3.0% is treated with nitric acid varying from 7 to 23 lbs. per ton of acid treated and a dark brown acid is obtained having a carbon content of 0.15 to 2.8% and which is completely soluble in water, giving a clear yellow solution when diluted 20 cc. acid with 80 cc. water. The nitric acid used is roughly 50% of that required to oxidize all the carbon to carbon dioxide.

Theoretically about 5 lbs. of nitric acid is necessary to convert one pound of carbon to carbon monoxide. The hot recovered acid having a carbon content of 0.5% contains about 10 lbs. of carbon per ton of acid. Therefore, about 50 lbs. of nitric acid per ton of sulphuric acid would be required to decarbonize. According to this process, actually 20 to 30 lbs. are used per ton of sulphuric acid or 1% to 1.5% based on the sulphuric acid. All of the carbon is not converted into carbon monoxide, so there is left in the acid after the treatment about 0.25% of carbon but this carbon is completely soluble in the acid and also in water and therefore does not interfere with the activity or cleanliness of the acid.

I claim:

A process for reconditioning recovered sulphuric acid of 88 to 90% acid concentration containing carbonaceous materials, for reuse in a process involving the absorption and hydration of olefins which comprises heating the sulphuric acid containing 0.5 to 1% of carbonaceous material to a temperature just below the boiling point of said acid and treating the acid with nitric acid in an amount by weight not more than three times the weight of the carbonaceous material present in the sulphuric acid, then treating the acid with anhydrous ammonia to remove the nitric-sulphuric acid complexes, cooling and recycling the acid to the absorption step.

FRANCIS M. ARCHIBALD.